W. B. SMITH.
UNIT NON-SKID DEVICE.
APPLICATION FILED JULY 22, 1918.
1,401,503.
Patented Dec. 27, 1921.
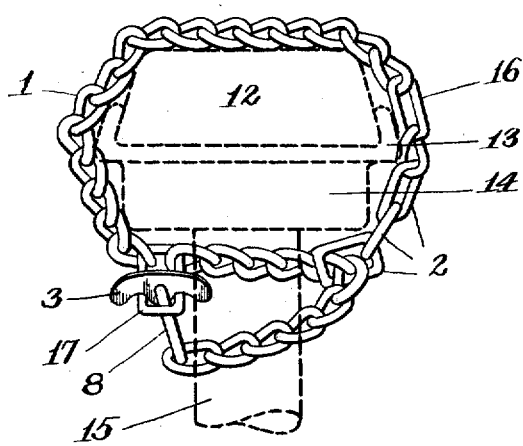
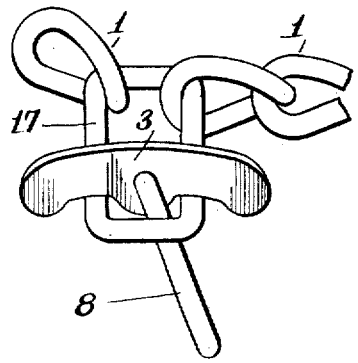
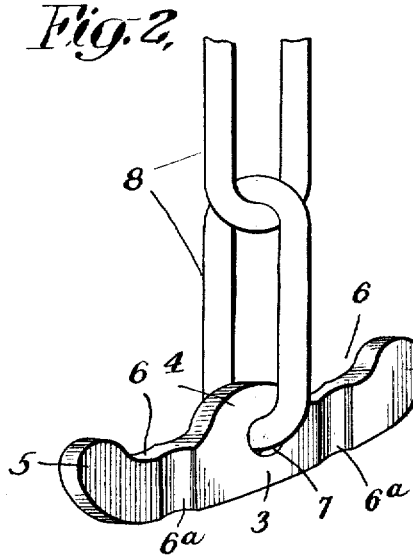
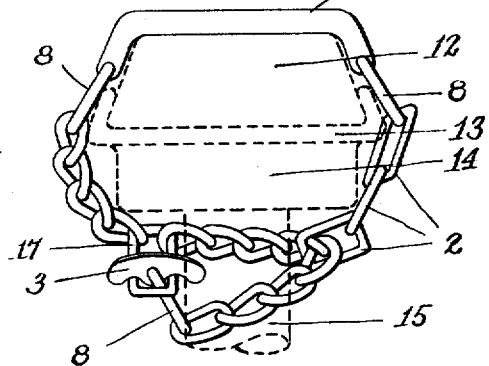
William Bramwell Smith, INVENTOR
BY
Frederick S. Duncan ATTORNEY

UNITED STATES PATENT OFFICE.

WILLIAM B. SMITH, OF NIAGARA FALLS, ONTARIO, CANADA, ASSIGNOR TO AMERICAN CHAIN COMPANY, INC., OF BRIDGEPORT, CONNECTICUT, A CORPORATION OF NEW YORK.

UNIT NON-SKID DEVICE.

1,401,503.      Specification of Letters Patent.      Patented Dec. 27, 1921.

Application filed July 22, 1918. Serial No. 246,200.

*To all whom it may concern:*

Be it known that I, WILLIAM BRAMWELL SMITH, a citizen of the United States, and temporarily a resident of Niagara Falls, Ontario, Canada, have made a certain new and useful Invention Relating to a Unit Non-Skid Device, of which the following is a specification, taken in connection with the accompanying drawings, which form part of the same.

My invention relates especially to unit anti-skid devices adapted for use on tires of motor trucks and similar vehicles. These devices are adapted to extend once or more around the tire and felly and are preferably provided with means for temporary attachment to a spoke as by a member or part arranged to encircle the spoke. It is customary to use a number of these devices on each wheel sometimes six or eight detachably secured thereto. Among the objects of my invention is to provide a simple and cheap device which can be attached and detached with great ease and yet when in use is securely held in place and cannot accidentally be detached. To that end my invention consists in the improved structure and securing means hereinafter claimed.

In the accompanying drawings showing illustrated embodiments of the invention, Figure 1 illustrates in a somewhat diagrammatic manner the different ways in which a non-skid unit device can be placed about the tire and felly not secured to a spoke. Fig. 2 is an enlarged view of the toggle bar securing device and Fig. 3 illustrates the toggle bar in operative connection with one of the links of the unit device. Fig. 4 shows a modification of the unit non-skid device adapted for a solid tread piece.

As will be seen from the several illustrative embodiments of my invention shown in the accompanying drawings, the device consists of a tread member composed preferably of chain of any kind of links appropriate to the size of the wheel and the weight of the vehicle on which the device is used and of a length suitable to be passed one or more times around the tire and felly and the loose ends detachably connected, preferably after some portion of the chain has been passed around one of the spokes of the wheel. One end of the unit device, is provided with a fastening bar 3, preferably pivotally connected thereto. This fastening bar is shown in the drawings in the shape of a toggle-bar consisting preferably of a bar having a central portion or tongue 4 provided with a pivotal anchorage for the end link of the chain and having laterally extending arms, the ends of which are re-curved as shown at 5 5 and with the portions between the re-curved ends and the tongue cut away to form recesses 6 6. If desired the sides of the bar may be provided with grooves 6ª 6ª located at points opposite the recesses 6 6 and preferably running across the face of the side of the bar in a direction corresponding with that of the side portion of the link when co-acting with the bar.

The opposite end of the unit device is provided with one or more links 2 of suitable shape to permit the toggle bar to be passed therethrough and then drawn back into operative engagement with the sides of the links so as to permit the toggle-bar and a number of the links of the chain to which such bar is attached to be passed therethrough and the toggle-bar brought into operative connection with some suitably located link in another portion of the unit device.

In Fig. 1 the chain is passed around the felly and tire, the bar 3 is passed through one of the end links 2, the chain is then drawn back and around the spoke and the bar 3 is then connected with a suitable link in the chain 1, as for example, the link 17, which is located a short distance from the toggle-bar preferably a little more than enough completely to encircle the spoke of the wheel.

Fig. 3 illustrates a form of link that can suitably be used at desired points in the unit device. Ordinarily this link extends longitudinally in the same direction as the other links of the chain 1, but when engaged by the bar 3, would be brought more or less at right angles to the other links and into the position shown in Fig. 3. It should be understood of course, that any suitable form of link may be used in the device; that all of the links may if desired be made of such shape and size as to permit of operative engagement with the bar or as to permit the bar and succeeding links to be passed therethrough; or suitable links of requisite shape for such purpose may be used at desired points in the device which for the most part may be made of smaller links.

Figs. 2 and 3, illustrate the preferred form of my toggle-bar. When such a bar having a re-curved shoulder 5 5 and the recesses 6 6 is passed through a link and drawn into operative engagement therewith as by the strain caused by the operation of the wheel upon which the device is placed, the sides of the link are drawn into the recesses 6—6 and the end of the link is held against the tongue 4 or the link to which said tongue is connected, thus making it impossible for the bar accidentally to become detached from the link. Where as is shown in Fig. 2, the side faces of the bar are provided with the grooves $6^a$ $6^a$ the sides of the link are held in such grooves as well as in the recesses 6 6, thus adding to the security of the engagement. When the strain on the chain is relieved sufficiently to permit the toggle-bar to be canted and one end passed through the link, the bar may easily be disengaged from the link and the device removed from the wheel. Yet whatever may be the particular detail of the toggle-bar or the particular method of applying the device to the wheel the toggle-bar connection with the desired link of the device though simple and easily made, is sufficient where the device is in use always to hold it securely in place against accidental coming off.

Fig. 4 shows a modification of the device comprising a tread member made of a solid bar 18 bent into desired shape to partly encircle the tire.

As already indicated, my invention may be embodied in various modifications and various forms and arrangements of links and of the fastening bar may be used and the device may be variously applied to the wheel without departing from the spirit of my invention.

I do not, therefore, intend to be limited to details shown but what I claim as my invention is as follows:

1. A fastening device for anti-skid devices comprising a bar adapted to be pivotally connected at a point intermediate the ends thereof to a chain end, the ends of said bar being recurved and the side faces thereof being grooved to receive the side strands of a connected link.

2. A fastening device for anti-skid devices comprising a bar adapted to be pivotally connected at a point intermediate the ends thereof to a chain end, the side faces of said bar being grooved to receive the side strands of a connected link.

WM. B. SMITH.